United States Patent [19]

Buckwitz

[11] 4,034,612

[45] July 12, 1977

[54] MULTIPLE PURPOSE INSTRUMENT HOUSING

[75] Inventor: Richard J. Buckwitz, Evanston, Ill.

[73] Assignee: General Signal Corporation, Rochester, N.Y.

[21] Appl. No.: 661,240

[22] Filed: Feb. 25, 1976

[51] Int. Cl.² .................. G01D 11/24; G01L 19/14
[52] U.S. Cl. .................................... 73/431; 73/416
[58] Field of Search ...................... 73/431, 416, 411

[56] References Cited

U.S. PATENT DOCUMENTS

| | | | |
|---|---|---|---|
| 1,435,922 | 11/1922 | Hasse | 73/416 |
| 2,463,844 | 3/1949 | Anderson | 73/431 |
| 3,177,722 | 4/1965 | Huston | 73/416 X |
| 3,201,992 | 8/1965 | Hoff, Jr. | 73/431 X |
| 3,874,241 | 4/1975 | Harland et al. | 73/416 |

FOREIGN PATENT DOCUMENTS

| | | | |
|---|---|---|---|
| 449,827 | 7/1936 | United Kingdom | 73/416 |

*Primary Examiner*—S. Clement Swisher
*Assistant Examiner*—Joseph W. Roskos
*Attorney, Agent, or Firm*—Harold Huberfeld; Jeffrey S. Mednick

[57] ABSTRACT

A pressure gauge assembly is provided having a pressure responsive mechanism, a case enclosing the mechanism, and a transparent face plate for the front of the case. The case has a back plate and a generally cylindrical wall attached thereto. A plurality of relatively short segmented thread projections, forming a thread of relatively fine pitch, protrude from the outer surface of the wall and extend along a helical path. Additionally, a plurality of protuberances protrude from the inner surface of the wall. Either the projections or the protuberances function to mount the face plate. The back plate may include a portion which is recessed inwardly toward the face plate and a plurality of holes for blow-out protection, distributed about its remaining portion.

11 Claims, 10 Drawing Figures

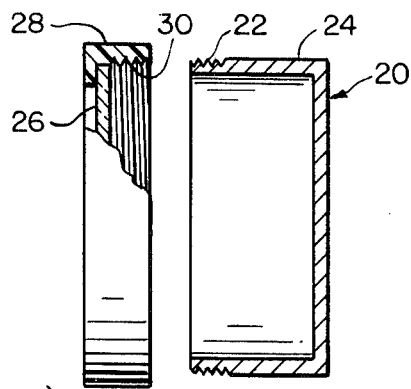
FIG. 1 (PRIOR ART)
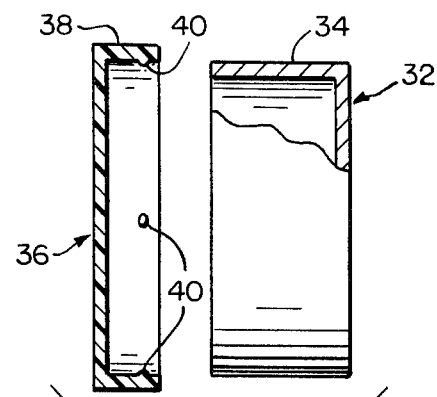
FIG. 2 (PRIOR ART)
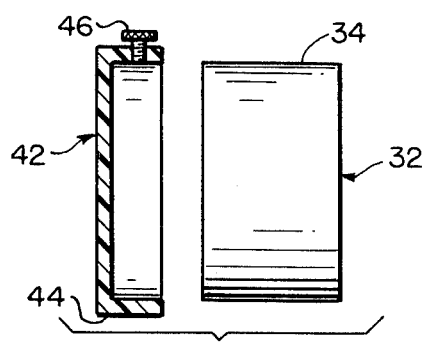
FIG. 3 (PRIOR ART)
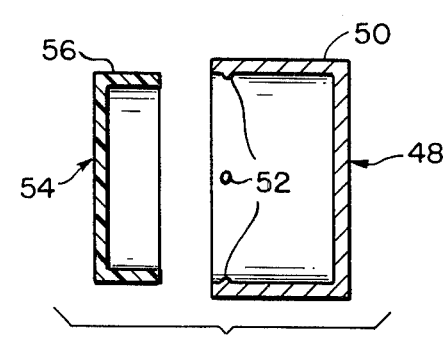
FIG. 4 (PRIOR ART)
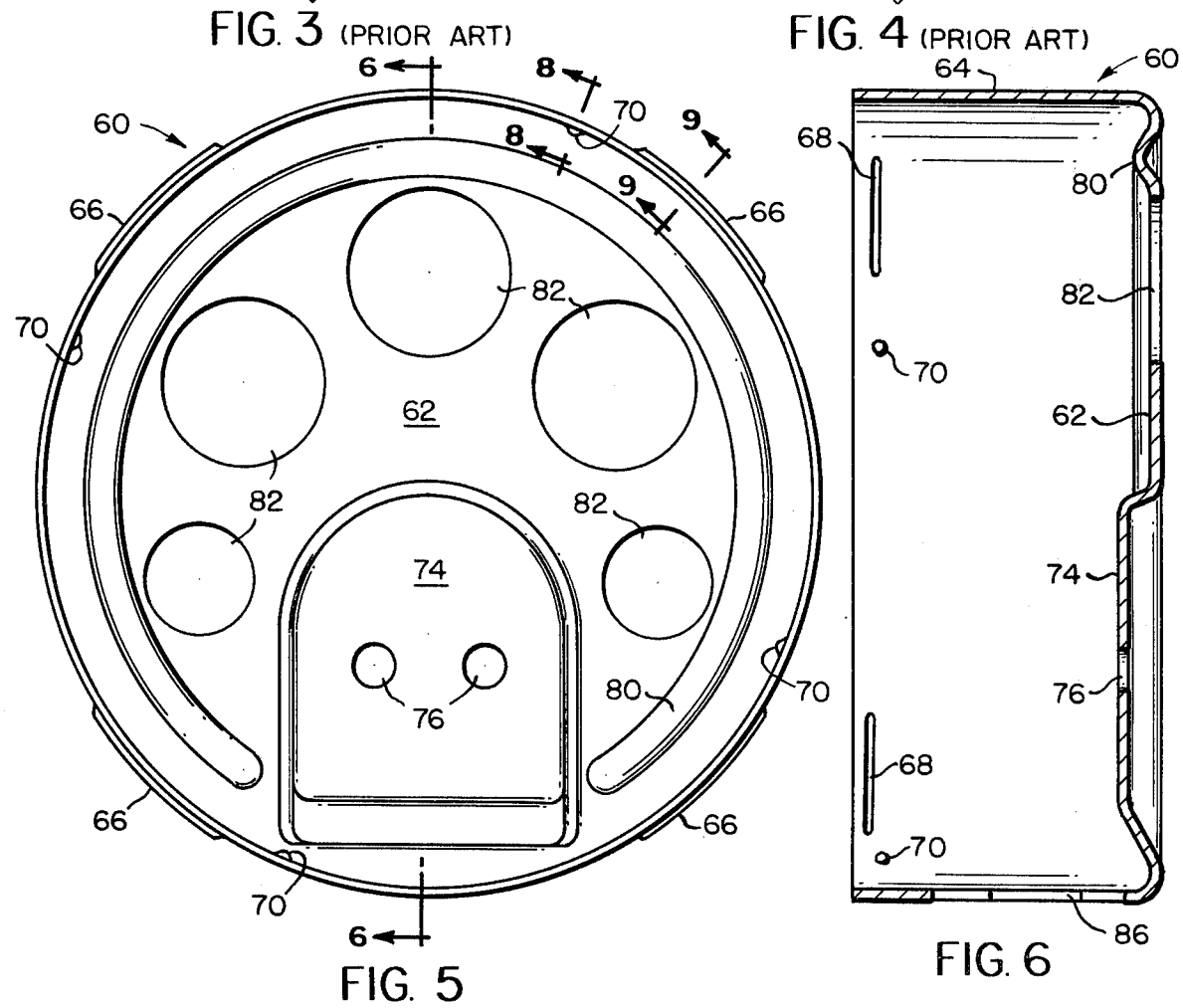
FIG. 5
FIG. 6

MULTIPLE PURPOSE INSTRUMENT HOUSING

BACKGROUND OF THE INVENTION

The present invention relates generally to gauges for measuring fluid pressure and more particularly to a new and unique case for a fluid pressure gauge.

A frequent problem which has been encountered by those using fluid pressure gauges has been that the crystal, or transparent face plate of the gauge, usually requires replacement before any other portion of the gauge. The problem is that historically these face plates have been affixed to the gauge case in one of four different ways: (1) by retaining the face plate with a threaded ring which screws onto the outside surface of the gauge case, (2) by utilizing a molded plastic face plate having protuberances on its inside surface to engage the outer surface of the gauge cases in a friction fit relationship, (3) by utilizing a transparent plastic face plate which is secured to the outer surface of the gauge case by means of a set screw, and (4) a transparent plastic face plate which engages protuberances on the inside surface of the gauge case in a friction fit relationship. The problem has been that the suppliers of these gauges have been forced to stock all four different types of face plates so that they would have them readily available for replacement in the field. Additionally, it has been historically true that two types of gauge housings have been required, one for low pressure gauges and one for high pressure gauges. The low pressure gauges required the use of a wide Bourdon tube which necessitated the use of a recessed portion on the back plate to permit adequate clearance for the Bourdon tube to operate. The high pressure gauges did not include this recessed portion but did include blowout protection of some sort to make sure that some portion of the rearward portion of the gauge would blow before any other portion.

OBJECTS OF THE INVENTION

An object of the present invention is the provision of a single gauge case which overcomes all of the aforementioned difficulties.

Another object of the present invention is the provision of a gauge case which will accommodate all existing face plates.

A further object of the present invention is the provision of a gauge case which may be utilized with either high or low pressure, pressure responsive mechanisms.

Still another object of the present invention is the provision of a gauge case which is both easy and inexpensive to manufacture.

SUMMARY OF THE INVENTION

Accordingly, the present invention provides a pressure gauge assembly having a pressure responsive mechanism, a case enclosing the mechanism, and a transparent face plate for the front of the case. The case has a back plate and a generally cylindrical wall attached thereto. A plurality of relatively short segmented thread projections, forming a thread of relatively fine pitch, protrude from the outer surface of the wall and extend in a helical path about the outer surface. Additionally, a plurality of protuberances protrude from the inner surface of the wall. Either the projections or the protuberances function to mount the face plate. An additional feature of the gauge is that a portion of the back plate may be recessed inwardly toward the face plate and a plurality of holes, for blowout protection, are distributed about the remaining portion of the back plate.

Other objects, advantages, and novel features of the present invention will become apparent from the following detailed description of the invention, when considered in conjunction with the accompanying drawings.

BRIEF DESCRIPTION OF THE DRAWINGS

FIGS. 1, 2, 3, and 4 are schematic illustrations of four types of gauge cases and face plates which are part of the prior art.

FIG. 5 shows a rear view of the gauge case of the present invention.

FIG. 6 shows a cross-sectional view of the gauge case of the present invention taken along section 6 — 6 of FIG. 5.

DESCRIPTION OF THE PREFERRED EMBODIMENTS

Figure 7:
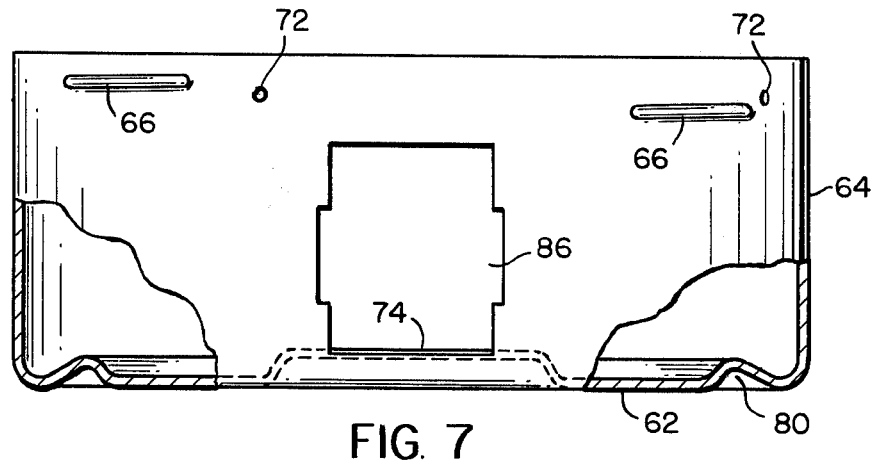
FIG. 7 shows a bottom view of the gauge case of the present invention.
Figure 8:
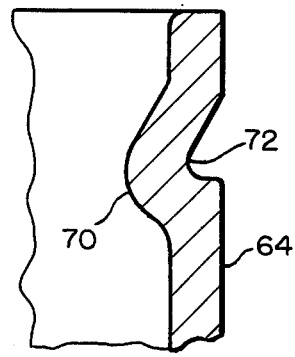
FIG. 8 shows a partial cross-sectional view of the gauge case of the present invention taken along lines 8 — 8 of FIG. 5.
Figure 9:
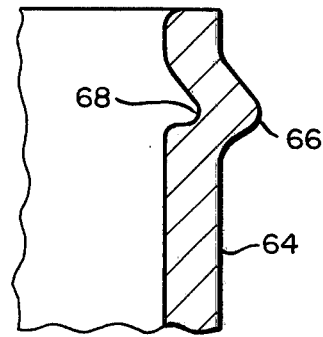
FIG. 9 shows a partial cross-sectional view taken along lines 9 — 9 of FIG. 5.

In order to more fully appreciate the contribution made to the art by the present invention, a brief discussion of the prior art is in order. This discussion will be made in connection with FIGS. 1 through 4 which schematically illustrate four different types of known pressure gauge cases and face plates. FIG. 1 shows a case 20 having a threaded portion 22 on the front of a generally cylindrical wall portion 24. A transparent face plate 26 is secured to the front of the case 20 by means of a retainer ring 28 having a threaded portion 30 on the inside of its rear surface. The threaded portion 30 of retainer ring 28 threadingly engages the threaded portion 22 on the outside surface of case 20 to thereby hold the transparent face plate 26 in place.

FIG. 2 shows a pressure gauge case 32 having a smooth, generally cylindrical wall 34 attached thereto. This type of case is suitable for use with a transparent face plate 36 having a cylindrical wall portion 38 including a plurality of protuberances 40 protruding from the inside surface of the cylindrical wall portion 38. The protuberances 40 engage the outer surface of wall portion 34 in a friction fitting relationship to thereby hold the transparent face plate 36 in place.

FIG. 3 shows a pressure gauge case 32 having a smooth, cylindrical wall surface 34 which is identical to the pressure gauge housing shown in FIG. 2. This case is also suitable for use with a transparent face plate 42 having a cylindrical wall surface 44 which threadingly retains a set screw 46. The transparent face plate 42 fits over the outside surface of smooth wall portion 34 so that the set screw 46 can be tightened to engage the wall surface 34 in a friction fitting relationship.

FIG. 4 shows a pressure gauge case 48 having a generally cylindrical wall surface 50 attached thereto and a plurality of protuberances 52 extending inwardly toward the center of the housing from the inner surface of the wall 50. A transparent face plate 54 is provided with a cylindrical wall surface 56 which is adapted to fit inside the gauge housing 48 and be retained in a friction fitting relationship with the protuberances 52.

Thus it can be seen from the above discussion that four different types of transparent face plates have been utilized in the prior art and have necessitated the use of three different types of gauge case mounting means. The gauge cases have either required a threaded outer surface as shown in FIG. 1, a smooth outer surface as shown in FIGS. 2 and 3, or an inner surface having protuberances thereon as shown in FIG. 4.

The pressure gauge assembly of the present invention will now be described in connection with FIGS. 5 through 9. The pressure gauge case of the present invention generally shown at 60, has a back plate 62 and a generally cylindrical wall 64 attached thereto. Extending about the outer surface of the cylindrical wall 64 are a plurality of segmented thread projections 66 which protrude outwardly from the wall 64. The case 60 is preferably made of metal, and the projections 66 are punched out of the wall 64 leaving depressions 68 on the inner surface of wall 64, as can be most clearly seen in FIG. 9. The segmented thread projections 68 are illustrated as four in number and are also preferably as short as possible to sufficiently retain a face plate and to permit easy manufacture. Thus if four projections are chosen, as shown, they may each extend over an arc of twenty to thirty degrees. If one chooses to utilize a greater number of segmented thread projections and should manufacturing constraints permit, the length of the individual projections may be reduced even further. It should be understood that as the projections increase in length, it is necessary to use more force to form them, and accordingly, a bigger punch press is required. The segmented thread projections 68 are preferably formed into a thread having a relatively fine or shallow pitch for greater holding or locking properties. If the thread is too coarse, it will not be self-locking. It has been found that sixteen threads per inch is the preferred pitch of the thread 68, although any pitch in the range of approximately ten to forty threads per inch would be acceptable.

The wall portion 64 is also provided with a plurality of protuberances 70 on the inner surface thereof, protruding toward the center of the case 60. These protuberances are also punched out of the wall surface 64 leaving depressions 72 on the outer surface thereof, as can be best seen in FIG. 8. The protuberances 70 extend about a circular path on the inner surface of wall 64 and are preferably four in number. It should be further noted that the protuberances 70 are preferably located between the depressions 68.

Thus it can be seen that the gauge case 60 of the present invention may be utilized with any of the face plate designs shown in FIGS. 1 through 4. The threaded retainer ring 28, shown in FIG. 1, may be threadingly engaged with the segmented thread projections 68. The face plates 36 and 42, shown in FIGS. 2 and 3, respectively, may still be engaged in a friction fitting relationship with the outside surface of wall 64. Finally, a face plate, such as the face plate 54 in FIG. 4, may be engaged in a friction fitting relationship with the protuberances 70. Not only can the pressure gauge case 60 of the present invention accommodate all known prior art face plates, but it can do so without significantly increasing the cost of any of the prior art gauge cases, and while actually reducing the cost of the type of case shown in FIG. 1. This reduction in cost is accomplished by using a thinner wall than was necessary for cutting a thread in the outer surface of the case. Typically, for example, the case 60 may have a wall thickness of 0.032 inches, whereas the type of case illustrated in FIG. 1 usually necessitated a wall thickness of 0.050 inches. Additionally, while only flat face plates have been illustrated, the case of the present invention can easily accommodate bevelled face plates.

The pressure gauge case 60 of the present invention is also designed so that it may house either high or low pressure, pressure responsive mechanisms. To accomplish this the back plate 62 includes a recessed portion 74 which includes a pair of mounting holes 76. As can best be seen from FIG. 10, a pressure responsive mechanism, such as a Bourdon tube 78, is securely fastened to the recessed portion 74 of the back plate by any suitable means at the mounting holes 76. The back plate also includes a strengthening channel 80 which protrudes into the case 60. In low pressure applications when a relatively wide Bourdon tube is required to obtain accurate readings, the use of the recessed portion of the back plate as a mounting means displaces the Bourdon tube sufficiently from the channel 80 to avoid obstructing the operation of the Bourdon tube.

Figure 10:
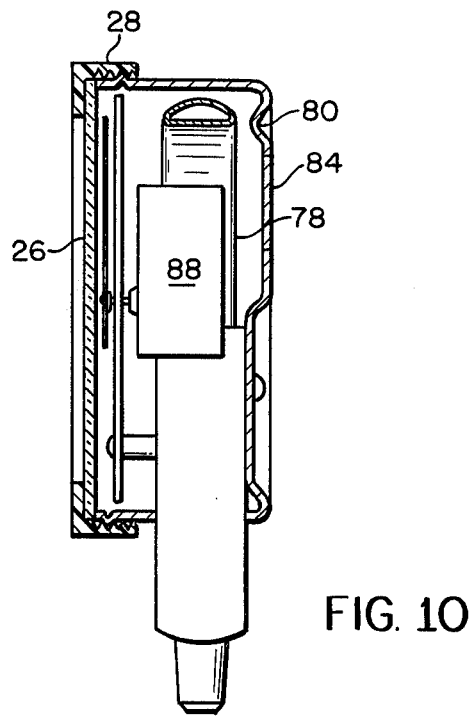
FIG. 10 shows a side cross-sectional view of an assembled gauge using the gauge case of the present invention.

For high pressure gauge operation, it is necessary to provide blowout protection which insures that some portion of the back plate of the gauge will rupture before any other portion. Accordingly, the gauge case 60 may include a plurality of blowout holes 82 distributed about the back plate 62. A plurality of smaller holes, such as the five illustrated, is utilized here to prevent weakening of the case 60 to the point where deformation might occur before blowout. It should be understood that other blowout hole configurations could be utilized as long as the structural rigidity of the case is maintained. As is best seen in FIG. 10 the holes 82 are plugged with suitable discs 84 which are sealed and designed to blow at a given pressure, in a known manner. Thus by providing both a recessed mounting surface and blowout protection, the gauge casing 60 is suitable for use in both high and low pressure applications.

The gauge case 60 is provided with a suitable opening 86 in the bottom thereof for receiving a pressure input signal, as best illustrated in FIG. 10. As is already well known in the art, such a pressure input signal may be provided anywhere along the wall 64 or at the back plate 62. FIG. 10 also shows one example of a complete pressure gauge assembly utilizing the gauge case of the present invention. Thus the gauge includes a Bourdon tube 78, a known pressure readout mechanism 88, a transparent face plate 26, and a retainer ring 28 of the type illustrated in FIG. 1. It is, of course, to be understood that the gauge case of the present invention is equally useful for housing vacuum type pressure sensitive mechanisms.

Thus, it is apparent that a pressure gauge assembly has been provided which is suitable for use at both high and low pressures and which can accommodate all known face plate designs. Furthermore, the gauge case is both easy and inexpensive to manufacture.

While there has been described what is at present considered to be the preferred embodiment of the present invention, it will be obvious to those skilled in the art that various changes and modifications may be made therein, without departing from the invention, and it is, therefore, aimed in the appended claims to cover all such changes and modifications as fall within the true spirit and scope of the present invention.

What is claimed is:

1. In a pressure gauge assembly having a pressure responsive mechanism, a case enclosing said mechanism, and a transparent face plate for the front of said case, said case having a back plate and a generally cylindrical wall having an inner surface and an outer surface attached thereto, the improvement comprising:
    a plurality of segmented thread projections protruding from one of said surfaces of said wall and extending in a helical path about said one surface of said wall, said projections being relatively short and forming a thread of relatively fine pitch, and a plurality of protuberances protruding from the other of said surfaces of said wall, whereby one of said projections and said protuberances function to mount said face plate.

2. A pressure gauge as set forth in claim 1, wherein said segmented thread projections protrude from the outer surface of said wall and said protuberances protrude from the inner surface of said wall.

3. A pressure gauge as set forth in claim 2, wherein said protuberances are located along a circular path about the inner surface of said wall.

4. A pressure gauge as set forth in claim 2, wherein said projections on said outer surface are punched out of said wall resulting in depressions on said inner surface and wherein said protuberances are located on the inner surface of said wall between the depressions on said inner surface.

5. A pressure gauge as set forth in claim 1, wherein said back plate includes a portion recessed inwardly toward said face plate and at least one hole, for blow-out protection, located about the remaining portion of said back plate.

6. A pressure gauge as set forth in claim 5, wherein said back plate includes a plurality of said holes.

7. A pressure gauge as set forth in claim 5, wherein said pressure responsive mechanism is securely affixed to said recessed portion of said back plate.

8. In a gauge assembly having a gauge mechanism, a case enclosing said mechanism, and a transparent face plate for the front of said case, said case having a back plate and a generally cylindrical wall having an inner surface and an outer surface attached thereto, the improvement comprising:
    a plurality of segmented thread projections protruding from one of said surfaces of said wall and extending in a helical path about said one surface of said wall, said projections being relatively short and forming a thread of relatively fine pitch, and a plurality of protuberances protruding from the other of said surfaces of said wall, whereby one of said projections and said protuberances function to mount said face plate.

9. A gauge as set forth in claim 8, wherein said segmented thread projections protrude from the outer surface of said wall and said protuberances protrude from the inner surface of said wall.

10. A gauge as set forth in claim 9, wherein said protuberances are located along a circular path about the inner surface of said wall.

11. A gauge as set forth in claim 9, wherein said projections on said outer surface are punched out of said wall resulting in depressions on said inner surface and wherein said protuberances are located on the inner surface of said wall between the depressions on said inner surface.

* * * * *